US011295289B2

(12) United States Patent
Byerley et al.

(10) Patent No.: US 11,295,289 B2
(45) Date of Patent: Apr. 5, 2022

(54) MOBILE COMMUNICATION SYSTEMS AND METHODS FOR REDEEMING AND REPORTING COUPONS

(71) Applicant: First Data Corporation, Coral Springs, FL (US)

(72) Inventors: Douglas Byerley, Overland Park, KS (US); John Cawthorne, Doylestown, PA (US); Sunil Dewan, Omaha, NE (US); Daniel Skowronek, Parker, CO (US); Steven E. Arthur, Castle Rock, CO (US); Christopher L. Toomer, Parker, CO (US)

(73) Assignee: FIRST DATA CORPORATION, Brookfield, WI (US)

(\*) Notice: Subject to any disclaimer, the term of this patent is extended or adjusted under 35 U.S.C. 154(b) by 485 days.

(21) Appl. No.: 16/533,416

(22) Filed: Aug. 6, 2019

(65) Prior Publication Data

US 2020/0034816 A1    Jan. 30, 2020

Related U.S. Application Data

(63) Continuation of application No. 15/695,940, filed on Sep. 5, 2017, now Pat. No. 10,410,201, which is a (Continued)

(51) Int. Cl.
*G06Q 20/32* (2012.01)
*G06Q 20/38* (2012.01)
(Continued)

(52) U.S. Cl.
CPC ......... *G06Q 20/32* (2013.01); *G06Q 20/3223* (2013.01); *G06Q 20/387* (2013.01);
(Continued)

(58) Field of Classification Search
CPC ............... G06Q 20/32; G06Q 20/3223; G06Q 30/0601; G06Q 30/0241; G06Q 30/0239;
(Continued)

(56) References Cited

U.S. PATENT DOCUMENTS 4,554,446 A    11/1985  Murphy et al.
5,200,889 A     4/1993  Mori
(Continued)

FOREIGN PATENT DOCUMENTS

EP        911772 A2      4/1999
EP        0949596 A2    10/1999
(Continued)

OTHER PUBLICATIONS

Amerinet, Inc., "Debait-it!—The Best Idea In Payment Systems Since the Credit Card", downloaded from website http://www.debit-it.com/ on Feb. 7, 2000, 8 pages.
(Continued)

*Primary Examiner* — Behrang Badii
(74) *Attorney, Agent, or Firm* — Foley & Lardner LLP

(57) ABSTRACT

Methods, systems, and machine-readable media are disclosed for utilizing mobile electronic devices to redeem and report use of various marketing offers such as coupons. According to one embodiment, redeeming and reporting a marketing offer can comprise transmitting information related to the marketing offer from a mobile wallet of the mobile device to a target device. A redemption message can be received at the mobile wallet of the mobile device from the target device. The redemption message can indicate acceptance of the marketing offer. At least a portion of the redemption message can be sent from the mobile wallet of the mobile device to a service provider system providing communication services to the mobile device. Sending the redemption message from the mobile wallet of the mobile (Continued)

device to the service provider system can be performed via a wireless communications network such as a cellular network.

20 Claims, 9 Drawing Sheets

Related U.S. Application Data continuation of application No. 11/830,336, filed on Jul. 30, 2007, now abandoned.

(51) Int. Cl.
  *G06Q 30/02* (2012.01)
  *G07F 17/42* (2006.01)
  *G06Q 30/06* (2012.01)

(52) U.S. Cl.
  CPC ............ *G06Q 30/02* (2013.01); *G07F 17/42* (2013.01); *G06Q 30/0207* (2013.01); *G06Q 30/0239* (2013.01); *G06Q 30/0241* (2013.01); *G06Q 30/0601* (2013.01)

(58) Field of Classification Search
  CPC .. G06Q 30/0207; G06Q 30/02; G06Q 20/387; G07F 17/42
  See application file for complete search history.

(56) References Cited

U.S. PATENT DOCUMENTS

| | | |
|---|---|---|
| 5,220,501 A | 6/1993 | Lawlor et al. |
| 5,263,853 A | 11/1993 | Stefani et al. |
| 5,555,496 A | 9/1996 | Tackbary et al. |
| 5,696,908 A | 12/1997 | Muehlberger et al. |
| 5,699,528 A | 12/1997 | Hogan |
| 5,757,917 A | 5/1998 | Rose et al. |
| 5,774,879 A | 6/1998 | Custy et al. |
| 5,777,305 A | 7/1998 | Smith et al. |
| 5,826,241 A | 10/1998 | Stein et al. |
| 5,832,458 A | 11/1998 | Jones |
| 5,899,980 A | 5/1999 | Wilf et al. |
| 5,905,246 A | 5/1999 | Fajkowski et al. |
| 5,923,016 A | 7/1999 | Fredregill et al. |
| 5,960,412 A | 9/1999 | Tackbary et al. |
| 5,987,140 A | 11/1999 | Rowney et al. |
| 5,987,429 A | 11/1999 | Maritzen et al. |
| 5,991,750 A | 11/1999 | Watson |
| 5,999,625 A | 12/1999 | Bellare et al. |
| 6,000,608 A | 12/1999 | Dorf |
| 6,012,045 A | 1/2000 | Barzilai et al. |
| 6,012,048 A | 1/2000 | Gustin et al. |
| 6,032,133 A | 2/2000 | Hilt et al. |
| 6,044,363 A | 3/2000 | Mori et al. |
| 6,058,379 A | 5/2000 | Odom et al. |
| 6,058,417 A | 5/2000 | Hess et al. |
| 6,070,798 A | 6/2000 | Nethery |
| 6,073,117 A | 6/2000 | Oyanagi et al. |
| 6,088,684 A | 7/2000 | Custy et al. |
| 6,098,053 A | 8/2000 | Slater |
| 6,119,106 A | 9/2000 | Mersky et al. |
| 6,122,625 A | 9/2000 | Rosen |
| 6,167,386 A | 12/2000 | Brown |
| 6,175,824 B1 | 1/2001 | Van Dusen |
| 6,226,623 B1 | 5/2001 | Schein et al. |
| 6,246,996 B1 | 6/2001 | Stein et al. |
| 6,336,099 B1 | 1/2002 | Barnett et al. |
| 6,473,500 B1 | 10/2002 | Risafi et al. |
| 6,547,132 B1 | 4/2003 | Templeton et al. |
| 6,827,260 B2 | 12/2004 | Stoutenburg et al. |
| 6,847,935 B1 | 1/2005 | Solomon et al. |
| 6,886,742 B2 | 5/2005 | Stoutenburg et al. |
| 7,006,983 B1 | 2/2006 | Packes et al. |
| 7,028,896 B2 | 4/2006 | Goldstein et al. |
| 7,086,584 B2 | 8/2006 | Stoutenburg et al. |
| 7,089,208 B1 | 8/2006 | Levchin et al. |
| 2001/0018664 A1 | 8/2001 | Jacoves et al. |
| 2001/0047342 A1 | 11/2001 | Cuervo |
| 2002/0049669 A1 | 4/2002 | Bleser et al. |
| 2002/0052841 A1 | 5/2002 | Guthrie et al. |
| 2002/0065774 A1 | 5/2002 | Young et al. |
| 2002/0107738 A1 | 8/2002 | Beach et al. |
| 2002/0120539 A1 | 8/2002 | Price |
| 2002/0152116 A1 | 10/2002 | Yan et al. |
| 2002/0152179 A1 | 10/2002 | Racov |
| 2002/0153414 A1 | 10/2002 | Stoutenburg et al. |
| 2002/0156683 A1 | 10/2002 | Stoutenburg et al. |
| 2002/0161641 A1 | 10/2002 | Quinlan et al. |
| 2002/0165795 A1 | 11/2002 | Holley et al. |
| 2002/0166891 A1 | 11/2002 | Stoutenburg et al. |
| 2003/0001005 A1 | 1/2003 | Risafi et al. |
| 2003/0009393 A1 | 1/2003 | Norris |
| 2003/0024981 A1 | 2/2003 | Narasimhan |
| 2003/0028484 A1 | 2/2003 | Boylan et al. |
| 2003/0053609 A1 | 3/2003 | Risafi et al. |
| 2003/0065805 A1 | 4/2003 | Barnes, Jr. |
| 2003/0088461 A1 | 5/2003 | Christensen |
| 2003/0097331 A1 | 5/2003 | Cohen |
| 2003/0115126 A1 | 6/2003 | Pitroda |
| 2003/0150142 A1 | 8/2003 | Street |
| 2003/0154163 A1 | 8/2003 | Phillips et al. |
| 2003/0222135 A1 | 12/2003 | Stoutenburg et al. |
| 2003/0229541 A1 | 12/2003 | Randall et al. |
| 2004/0019564 A1 | 1/2004 | Goldthwaite et al. |
| 2005/0033639 A1 | 2/2005 | Myers |
| 2005/0192897 A1 | 9/2005 | Rogers et al. |
| 2006/0020542 A1 | 1/2006 | Litle et al. |
| 2006/0047569 A1 | 3/2006 | Sulaiman |
| 2006/0052055 A1 | 3/2006 | Rowse et al. |
| 2006/0074784 A1 | 4/2006 | Brown |
| 2006/0155874 A1 | 7/2006 | Hunter |
| 2006/0178932 A1 | 8/2006 | Lang |
| 2006/0253335 A1 | 11/2006 | Keena et al. |
| 2007/0094113 A1 | 4/2007 | Chapeta |
| 2007/0156436 A1 | 7/2007 | Fisher et al. |
| 2008/0010215 A1 | 1/2008 | Rackley, III et al. |
| 2008/0017704 A1 | 1/2008 | VanDeburg et al. |
| 2008/0021772 A1 | 1/2008 | Aloni et al. |
| 2008/0097851 A1* | 4/2008 | Bemmel ............ G06Q 30/0236 705/14.36 |
| 2008/0116283 A1 | 5/2008 | Newbrough et al. |
| 2008/0167017 A1* | 7/2008 | Wentker ................. G06Q 20/10 455/414.1 |
| 2008/0167961 A1* | 7/2008 | Wentker ............. G06Q 20/3278 705/14.25 |
| 2008/0208742 A1 | 8/2008 | Arthur et al. |
| 2009/0271267 A1* | 10/2009 | Moukas ............ G06Q 30/0251 705/14.48 |
| 2012/0226530 A1* | 9/2012 | Gebb ................. G06Q 30/0234 705/14.1 |
| 2012/0323657 A1* | 12/2012 | Tiku .................... G06Q 30/0261 705/14.17 |
| 2013/0080241 A1* | 3/2013 | Fisher ................. G06Q 30/0613 705/14.38 |
| 2019/0188677 A1* | 6/2019 | Arthur .................... H04W 4/24 |

FOREIGN PATENT DOCUMENTS

| | | |
|---|---|---|
| EP | 1077436 A2 | 2/2001 |
| WO | 00/22559 A1 | 4/2000 |
| WO | 00/34899 A1 | 6/2000 |
| WO | 00/54122 A2 | 9/2000 |
| WO | 00/67177 A2 | 11/2000 |
| WO | 00/79452 A2 | 12/2000 |
| WO | 01/04816 A1 | 1/2001 |
| WO | 01/41419 A1 | 6/2001 |

OTHER PUBLICATIONS

Confinity, Inc., PayPal.com, How PayPal.com Works, download from website http://www.paypal.com on Feb. 7, 2000, 7 pages.

(56) References Cited

OTHER PUBLICATIONS

Dotbank, "The Way to Send and Receive Money on the Internet," download from website http:/www.dotbank.com, Feb. 7, 2000, 6 pages.
Idealab Company, "PayMe.com," download from website http://ssl.idealab.com on Feb. 16, 2000, 7 pages.
Intell-A-Check Corp.: "Intell-A-Check!—The Way to get Paid", Intell-A-Check product overview, retrieved from http://www.icheck.com/ on Feb. 7, 2000, 7 pages.
TeleCheck International, Inc. "Making Checks Our Responsibility", retrieved from http://www.telecheck.com/home/home.html on Feb. 7, 2000, 8 pages.
Telecheck, Verification Services, Internet, http://telecheck.com, Feb. 7, 2000.
The Denver Post, Apr. 1, 2002, "Rebate Quests Often Result in Unhappy Returns".
Transpoint, "The Way to Pay Online" downloaded from website http://www.transpoint.com/ on Feb. 10, 2000, 12 pages.
International Search Report and Written Opinion dated Oct. 3, 2008 in related foreign application No. PCT/US2008/070987, 8 pgs.
International Preliminary Report on Patentability dated Feb. 2, 2010 in related foreign application No. PCT/US2008/070987, 9 pgs.

\* cited by examiner

MOBILE COMMUNICATION SYSTEMS AND METHODS FOR REDEEMING AND REPORTING COUPONS

CROSS REFERENCES TO RELATED APPLICATION(S)

The present application is a continuation of U.S. patent application Ser. No. 15/695,940, filed Sep. 5, 2017, entitled "MOBILE COMMUNICATION SYSTEMS AND METHODS FOR REDEEMING AND REPORTING COUPONS," which is a continuation of U.S. patent application Ser. No. 11/830,336, filed Jul. 30, 2007, entitled "MOBILE COMMUNICATION SYSTEMS AND METHODS FOR REDEEMING AND REPORTING COUPONS," the entire disclosure of which is hereby incorporated by reference herein for all purposes.

BACKGROUND OF THE INVENTION

Embodiments of the present invention generally relate to mobile commerce. More specifically, embodiments of the present invention relate to methods and systems for redeeming and reporting use of marketing offers such as coupons via mobile electronic devices.

Today, merchants and service providers accept many forms of payment. Many merchants will accept cash, credit cards, debit cards, stored-value cards, checks, and promotional items such as coupons. Additionally, various forms of wireless or contactless devices have been introduced for use in various types of transactions. For example, contactless transaction initiation is often performed with a "smart" card or other device such as a key fob or a mobile device such as a cell phone or Personal Digital Assistant (PDA) containing a memory and a processor. Such a card or device typically also includes Radio-Frequency IDentification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

Various types of marketing offers, such as coupons, discount offers, etc. can be stored on the contactless device and can also be used in the transaction. For example, a marketing offer such as a coupon can be stored on a mobile device such as a cell phone or PDA for use in a contactless transaction. When the coupon is redeemed, information related to the coupon can be displayed on the device and presented to the merchant at a POS. For example, the mobile device can display a bar code representing the coupon that can be scanned at the POS. The merchant is then responsible for communicating information about the redemption of the coupon to an entity tracking the coupon. For example, the merchant sends a message to the provider of the coupon, a provider of wireless services for the consumer's device, or another entity to record redemption of the coupon.

However, this approach presents some possible problems. For example, the merchant may not report use of a coupon. In such a case, the consumer can re-use the same coupon even if not entitled to do so. In other cases, even if the merchant reports use of the coupon, it may not be in a timely enough manner to prevent re-use of the coupon by the consumer. Hence, there is a need in the art for improved methods and systems for redeeming and reporting use of marketing offers such as coupons via mobile electronic devices.

BRIEF SUMMARY OF THE INVENTION

Methods, systems, and machine-readable media are disclosed for utilizing mobile electronic devices to redeem and report use of various marketing offers such as coupons. According to one embodiment, a method for redeeming and reporting a marketing offer from a mobile wallet application of a mobile device can comprise transmitting information related to the marketing offer from the mobile wallet of the mobile device to a target device. For example, transmitting the information related to the marketing offer from the mobile wallet of the mobile device to the target device can be performed via a Near-Field Communication between the mobile device and the target device. In some cases, prior to transmitting the information related to the marketing offer from the mobile wallet of the mobile device to the target device, a selection of the marketing offer from a plurality of marketing offers in the mobile wallet of the mobile device can be received. In such a case, transmitting the information related to the marketing offer from the mobile wallet of the mobile device to the target device can comprise transmitting information related to the selected marketing offer.

A redemption message can be received at the mobile wallet of the mobile device from the target device. The redemption message can indicate acceptance of the marketing offer. At least a portion of the redemption message can be sent from the mobile wallet of the mobile device to a service provider system providing communication services to the mobile device. Sending the redemption message from the mobile wallet of the mobile device to the service provider system can be performed via a wireless communications network such as a cellular network. In reply, a delete message from the service provider system and related to the marketing offer can be received at the mobile wallet of the mobile device. In response to receiving the delete message, the marketing offer can be deleted from the mobile wallet of the mobile device.

According to another embodiment, a method of redeeming a marketing offer can comprise receiving at a target device information related to a marketing offer from a mobile wallet application of a mobile device. For example, receiving at the target device the information related to the marketing offer from the mobile wallet of the mobile device can be performed via a Near-Field Communication between the target device and the mobile device. An indication of acceptance of the marketing offer can be received at the target device. In some cases, prior to receiving at the target device the indication of acceptance of the marketing offer, at least a portion of the information related to the marketing offer can be presented via the target device. In response to receiving at the target device the indication of acceptance of the marketing offer, a redemption message can be transmitted from the target device to the mobile device. Transmitting the redemption message from the target device to the mobile device may also be performed via a Near-Field Communication between the target device and the mobile device.

According to yet another embodiment, a method of managing one or more marketing offers can comprise receiving at a service provider system a redemption message related to a selected marketing offer of one or more marketing offers from a mobile wallet of a mobile device. For example, receiving at the service provider system the redemption message related to the selected marketing offer from the mobile wallet of the mobile device can comprise receiving the redemption message via a wireless communications network such as a cellular network. A delete message can be generated by the service provider system related to redemption of the selected marketing offer. The delete message can be sent from the service provider system to the mobile wallet of the mobile device. Sending the delete message to the mobile wallet of the mobile device can comprise sending the delete message via a wireless communications network such as a cellular network.

In some cases, a set of information related to the one or more marketing offers can be maintained. The information can include a status of each of the one or more marketing offers. The set of information related to the one or more marketing offers can be updated to indicate redemption of the selected marketing offer in response to receiving the redemption message. For example, maintaining the set of information related to the one or more marketing offers and updating the set of information related to the one or more marketing offers can be performed by the service provider system.

In another example, maintaining the set of information related to the one or more marketing offers and updating the set of information related to the one or more marketing offers can be performed by a system originating the selected marketing offer. In such a case, the redemption message can be provided to the system originating the selected marketing offer from the service provider system. The service provider system can then receive an instruction to delete the selected marketing offer from the mobile wallet of the mobile device from the system originating the selected marketing offer. In such cases, generating the delete message and sending the delete message from the service provider system to the mobile wallet of the mobile device can be performed in response to receiving the instruction to delete the selected marketing offer from the mobile wallet of the mobile device from the system originating the selected marketing offer.

In yet another example, maintaining the set of information related to the one or more marketing offers and updating the set of information related to the one or more marketing offers can be performed by an acquirer system. In such a case, the redemption message can be provided by the service provider system to the acquirer system. The service provider system can then receive an instruction to delete the selected marketing offer from the mobile wallet of the mobile device from the acquirer system. In such cases, generating the delete message and sending the delete message from the service provider system to the mobile wallet of the mobile device can be performed in response to receiving the instruction to delete the selected marketing offer from the mobile wallet of the mobile device from the acquirer system.

According to still another embodiment, a system can comprise a wireless communications network, such as a cellular network, and a service provider system communicatively coupled with the wireless communications network. The system can also include a target device including a Near-Field Communications module and a mobile device communicatively coupled with the wireless communications network and including a Near-Field Communications module. The mobile device can be adapted to execute a mobile wallet application. The mobile wallet application can maintain at least one marketing offer and can be further adapted to transmit information related to the marketing offer to the target device via the Near-Field Communications module of the mobile device. In some cases, the mobile wallet application of the mobile device, prior to transmitting the information related to the marketing offer to the target device, can be adapted to receive a selection of the marketing offer from a plurality of marketing offers and transmit the information related to the selected marketing offer to the target device.

The target device can be adapted to receive the information related to the marketing offer from the mobile wallet application of the mobile device via the Near-Field Communications module of the target device. The target device can also receive an indication of acceptance of the marketing offer. In some cases, for example, the target device can be further adapted to, prior to receiving the indication of acceptance of the marketing offer, present at least a portion of the information related to the marketing offer. In response to receiving the indication of acceptance of the marketing offer, the target device can transmit the redemption message to the mobile device via the Near-Field Communications module of the target device.

The mobile device can receive the redemption message from the target device via the Near-Field Communications module of the mobile device. The redemption message can indicate acceptance of the marketing offer. The mobile device can send at least a portion of the redemption message to the service provider system via the wireless communications network.

The service provider system can be adapted to receive the redemption message related to the selected marketing offer from the mobile wallet of the mobile device via the wireless communications network, generate a delete message related to redemption of the selected marketing offer, and send the delete message to the mobile wallet of the mobile device via the wireless communications network. In some cases, the service provider system can be further adapted to maintain a set of information related to one or more marketing offers. The information can include a status of each of the one or more marketing offers. In such cases, the service provider system can update the set of information related to the one or more marketing offers to indicate redemption of the selected marketing offer in response to receiving the redemption message.

In another example, the system can include an originator system communicatively coupled with the service provider system and adapted to maintain a set of information related to the one or more marketing offers. The information can include a status of each of the one or more marketing offers. In such a case, the service provider system can be further adapted to provide the redemption message to the originating system. The originator system can be further adapted to update the set of information related to the one or more marketing offers to indicate redemption of the selected marketing offer based on the redemption message from the service provider system. The service provider system can also be adapted to receive an instruction to delete the marketing offer from the mobile wallet of the mobile device from the originator system. In such cases, the service provider system can generate the delete message and send the delete message to the mobile wallet of the mobile device in response to receiving the instruction to delete the selected marketing offer from the mobile wallet of the mobile device from the originator system.

In yet another example, the system can include an acquirer system communicatively coupled with the service provider system and adapted to maintain a set of information related to the one or more marketing offers, the information including a status of each of the one or more marketing offers. In such a case, the service provider system can be further adapted to provide the redemption message to the acquirer system. The acquirer system can update the set of information related to the one or more marketing offers to indicate redemption of the selected marketing offer based on the redemption message from the service provider system. The service provider system can be adapted to receive an instruction to delete the marketing offer from the mobile wallet of the mobile device from the acquirer system. In such a case, the service provider system can generate the delete message and send the delete message to the mobile wallet of the mobile device in response to receiving the instruction to delete the selected marketing offer from the mobile wallet of the mobile device from the acquirer system.

DETAILED DESCRIPTION OF THE INVENTION

Figure 1:
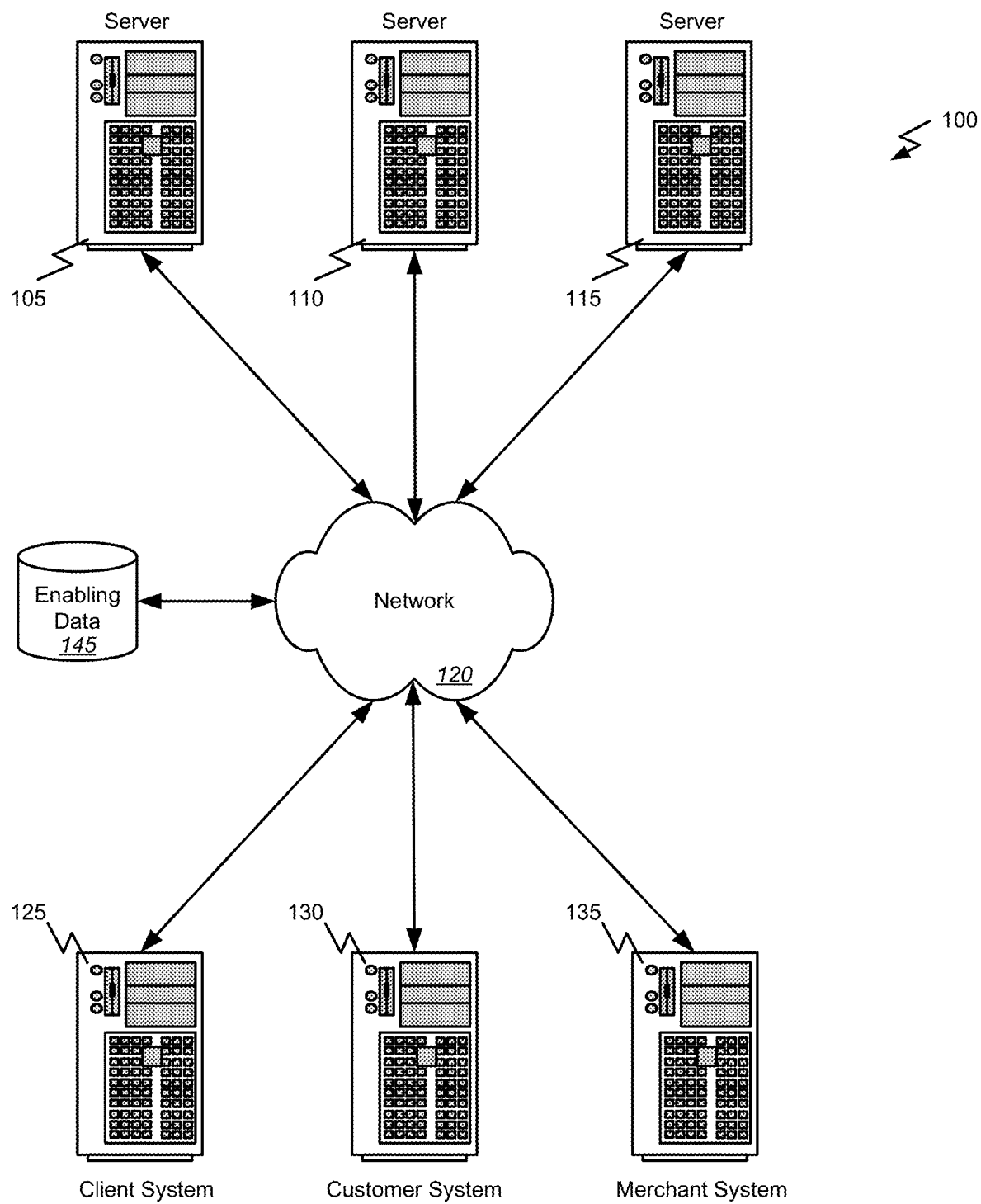
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions initiated by or otherwise involving use of a contactless or mobile device as well as other information related to one or more financial accounts. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "carrier" refers to a provider of a network and/or service for use by a mobile device. For example, a carrier can include, but is not limited to, a provider of a cellular or other wireless communications service for use by a mobile device. The terms "carrier" and "service provider" are used interchangeably herein and are intended to be synonymous.

The term "mobile device" is used herein to refer to any small, likely handheld, electronic device that can be used to initiate or otherwise participate in a financial transaction. For example, a mobile device can include, but is not limited to a cellular telephone, a Personal Digital Assistant (PDA), a smart card or other contactless device, etc. Exemplary devices that may be adapted for use as mobile devices in various embodiments of the present invention are described in co-pending and commonly assigned U.S. patent application Ser. No. 11/672,417 entitled "Contactless Electronic Wallet Payment Device" filed on Feb. 7, 2007; U.S. patent application Ser. No. 11/551,063 entitled "Presentation Instrument with Non-Financial Functionality" filed on Oct. 19, 2006; and U.S. Provisional Patent Application No. 60/833,022 entitled "Mobile Payment Device with Magnetic Stripe" filed on Jul. 24, 2006, each of which is incorporated herein by reference in its entirety for all purposes.

A "mobile wallet" refers to a software application that can reside on and/or be executed by a mobile device. According to one embodiment, the mobile wallet can be adapted to store payment vehicle information. In some cases, the mobile wallet can allow storage of multiple payment vehicles and can provide a user interface that can be used to select a specific payment vehicle. Additionally, the mobile wallet can be adapted to provide security to deter fraudulent and unauthorized use of the payment vehicles. As used herein, the terms mobile device, handset, and contactless device are intended to be synonymous. A "Mobile Wallet" can also be referred to as a handset "container".

"Near Field Communication" (NFC) refers to short range (20 cm or less) wireless technology used to facilitate communication between electronic devices in close proximity. For example, embodiments of the present invention provide for the use of NFC and/or other relatively short range communications between a mobile device and a POS device and/or target device such as when a user of the mobile device scans or waves the mobile device in front of or near the POS device and/or target device when paying for goods or services.

A "payment network" refers herein to an infrastructure that supports that exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

The term "payment vehicle" is used herein to refer to a method of payment. For example, payment vehicles can include, but are not limited to credit, debit, stored-value, and other types of accounts. In some embodiments, a payment vehicle can include loyalty points or other value accumulated, for example, under a loyalty program.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers (such as a vending machine), but may also be in other locations. For instance, certain automatic teller machines "ATMs" may be equipped to support transactions for the sale of movie or sporting-event tickets even remote from the merchant location; other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present invention are described in the following commonly assigned applications, the entire disclosures of which are incorporated herein by reference for all purposes: U.S. Provisional Patent Application No. 60/147,889, entitled "Integrated Point OF Sale Device," filed Aug. 9, 1999 by Randy J. Templeton et al.; U.S. patent application Ser. No. 09/634,901, entitled "Point of Sale Payment System," filed Aug. 9, 2000 by Randy J. Templeton et al.; U.S. patent application Ser. No. 10/116,689, entitled "Systems and Methods for Performing Transactions at a Point-of-Sale," filed Apr. 3, 2002 by Earney Stoutenburg et al.; U.S. patent application Ser. No. 10/116,733, entitled "Systems and Methods for Deploying a Point-of-Sale System," filed Apr. 3, 2002 by Earney Stoutenburg et al.; U.S. patent application Ser. No. 10/116,686, entitled "Systems and Methods for Utilizing A Point-of-Sale System," filed Apr. 3, 2002 by Earney Stoutenburg et al.; and U.S. patent application Ser. No. 10/116,735, entitled "Systems and Methods for Configuring a Point-of-Sale System," filed Apr. 3, 2002 by Earney Stoutenburg. As will be described, a POS device may include a target device for receiving marketing offer information or may be separate from such a target device.

A "POS processing system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present invention are described in commonly assigned U.S. Pat. Nos. 6,886,742, 6,827,260 and 7,086,584, the complete disclosures of which are herein incorporated by reference.

A "primary account number" or "PAN" refers to a number assigned to an account. The PAN is generally assigned by a financial institution maintaining the account. In most embodiments, it is anticipated that the PAN will identify an account associated with the wireless device. Identification of the PAN permits a financial institution that maintains the account to make a unique identification of the consumer initiating a payment or other transaction and determine which of potentially several accounts is to be used in supporting the transaction.

The terms "real time" or "near real time" are used herein to refer to a process or action that occurs within a relatively short time. Importantly, the terms real time and near real time are not intended to imply an immediate or instantaneous results or action. Rather, the terms are used to refer to process or actions that can be performed relatively quickly such as within several seconds or minutes.

The term "subscriber" is used herein to refer to a consumer who has contracted with a carrier to utilized the carrier's wireless communications network. It should be noted that the term subscriber is used in reference to a consumer contracting with a carrier while the terms customer/consumer, as described above, is used in reference to a consumer contracting with a financial services or merchant organization. It should be understood that the "subscriber" and "consumer/customer" can be the same individual or "user.".

A "target device" refers to a device used to communicate, for example via an NFC co with a mobile wallet of a mobile device and process one or more marketing offers from the mobile wallet of the mobile device. For example, the target device can receive marketing offer information from the mobile wallet of the mobile device during a purchase or other transaction. In some cases, the target device can comprise or be part of a point-of-sale device installed, for example, at a merchant location. In other cases, the target device can be separate from the point-of-sale device. In such cases, the target device, while separate from the point-of-sale device, may be co-located with the point-of-sale device and may be communicatively coupled with the point-of-sale device and/or a POS processing system.

The term "user" refers to an entity, typically a person, that is associated with a particular mobile device. Typically, the user is the person that owns, uses, or leases the mobile device and/or controls the content and use of the payment vehicles maintained within the mobile wallet of the device.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for supporting use of mobile devices in various types of financial transactions and, more specifically, transactions involving the use of a marketing offer such as a coupon, discount offer, etc. Generally speaking, a mobile device such as a cell phone, PDA, MP3 player, or other device can be adapted to execute a mobile wallet application and possibly other applications that provide any of a number of mobile commerce functions. For example, the mobile wallet and other elements described herein can allow the user of the mobile device to use the device to make purchases, receive and maintain receipts or other records of transactions, look up account balances, transfer balances, etc. Furthermore, the mobile wallet application can be adapted to store or maintain one or more marketing offers. The marketing offers can be loaded onto or provisioned to the mobile device in various manners. For example, provisioning a mobile device with one or more marketing offers can be performed in accord with the methods and systems described in U.S. application Ser. No. 11/830,420 filed on Jul. 30, 2007 and entitled "Provisioning of a Device for Mobile Commerce" which is herein incorporated by reference in its entirety for all purposes.

Marketing offers stored on or accessible by a mobile device can be accessed and used in financial transaction such as purchases through the mobile wallet. As will be described in detail below, when a marketing offer is used, the mobile device can send a message indicating redemption of the offer to an entity tracking use of the offer. The message can be sent via a wireless communication network, such as a cellular network, to the provider of the communication services, i.e., the wireless service provider. As will be seen, the service provider can track the use of the offer or may update or inform another entity of the redemption of the offer. In this way, redemption of the offer can be reported from the mobile device, through the wireless communications network and service provider to allow rapid reporting of the redemption without relying on the merchant or other party to the transaction.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc. The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications.

Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc.

Figure 2:
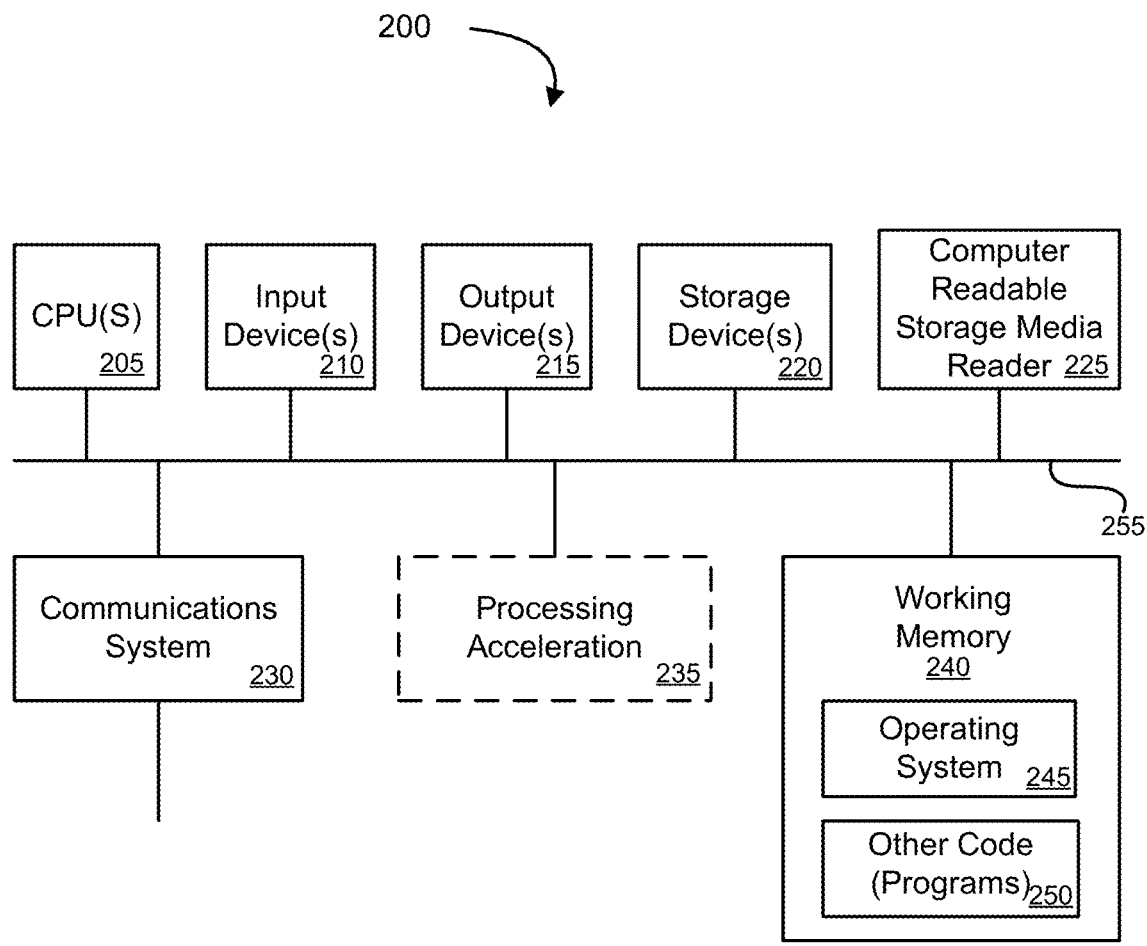
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
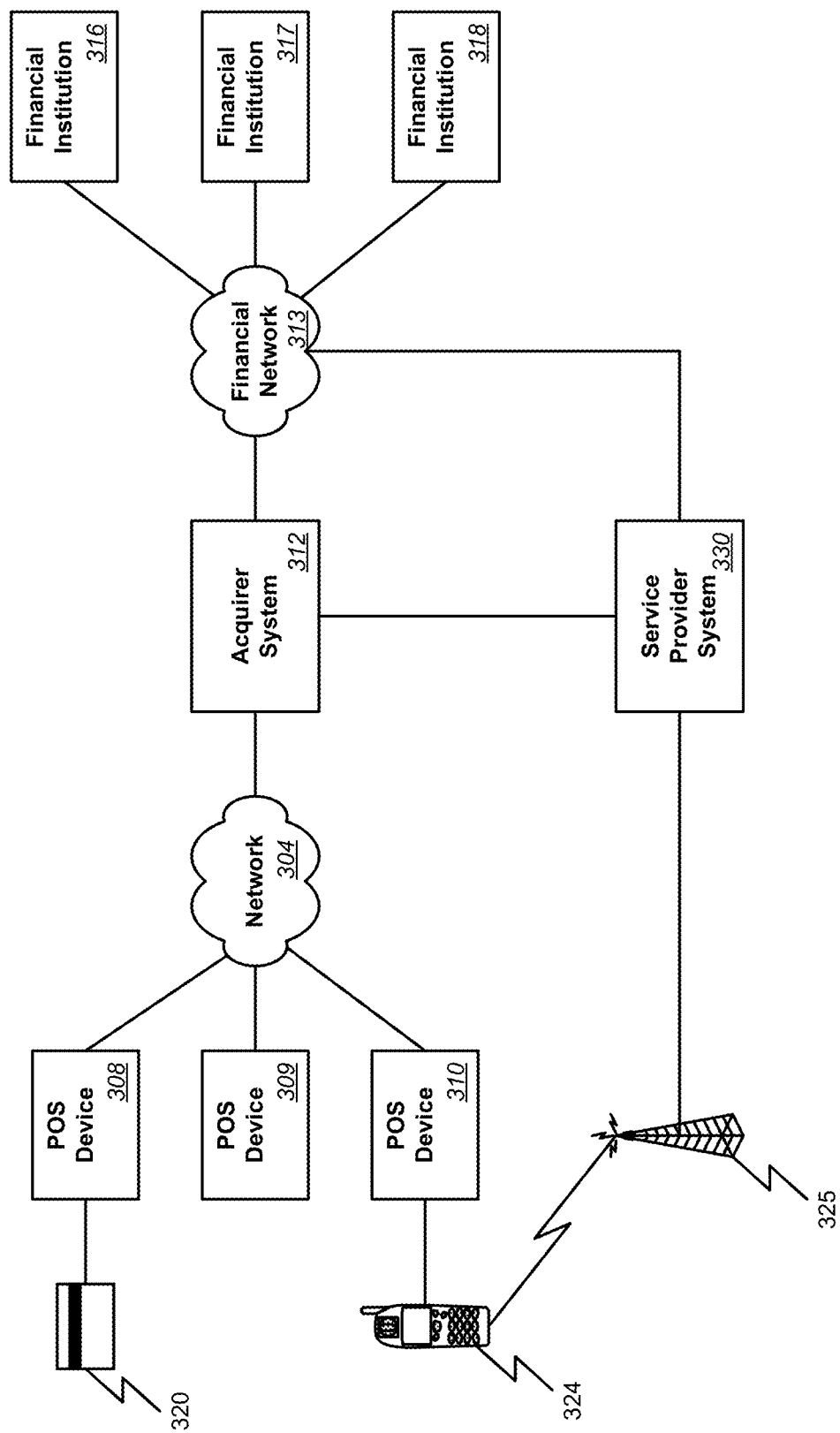
FIG. 3 is block diagram illustrating, at a high level, a system for processing transactions utilizing a mobile electronic device according to one embodiment of the present invention.

FIG. 3 is block diagram illustrating, at a high level, a system for processing transactions utilizing a mobile electronic device according to one embodiment of the present invention. Traditionally, a credit card may be issued to a customer by a financial institution such as a bank and typically displays a logo for an association that implements rules that govern aspects of use of the card. Account information is usually printed on the face of the card, specifying an account number and name of an authorized holder of the card; this information is also stored together with additional information on a magnetic stripe that is usually affixed to the back of the card. When the cardholder wishes to execute a transaction, such as a financial transaction for the purchase of goods and/or services, he presents the card 320 to a clerk at a merchant location, who swipes the card through a magnetic-stripe reader comprised by a point-of-sale device 308. Multiple point-of-sale devices 308-310 may have been provided at a variety of locations by an acquirer, who acts as an intermediary between merchants and the issuer financial institutions. As an intermediary, the acquirer coordinates transaction routing and performs a variety of backend processes.

The point-of-sale device 308 typically initiates a connection to an acquirer system 312 through a network 304 such as the Internet or another network as described above. A packet of information that includes information read from the magnetic stripe of the card 320, a merchant identifier, the date, and transaction amount are forwarded by the point-of-sale device 308 through the network 304 to the acquirer system 312. The acquirer system 312 may store some of the information and sends an authorization request, via financial network 313, to the issuing financial institution 316, which may be identified from a portion of the account number read from the magnetic stripe. The transaction is authorized or denied depending on such factors as the validity of the cardholder name, the validity of the card number, the level of available credit in comparison with the transaction amount, and the like. If authorized, an authorization code is routed back through the acquirer system 312, which captures additional information and forwards the authorization code back to the originating point-of-sale device 308 so that the transaction may be completed. Periodically, such as at the end of every day, the transactions are settled by the acquirer initiating funds transfers that fund merchant bank accounts with total transaction amounts that may have resulted from multiple transactions by multiple customers.

Other types of accounts may operate with similar structures, although the details for each type of account are different. For example, use of a debit account typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. Other types of accounts may use arrangements that have similar differences in their particulars.

According to one embodiment, a mobile device 324 may be used in addition to or instead of a card or other token representing an account. Here, the mobile device 324 is shown for exemplary purposes in the form of a cellular telephone. However, as noted above, the mobile device 324 may be any of a variety of different mobile devices including but not limited to a cell phone, PDA, MP3 player, etc. The mobile device 324 may communicate according to its normal wireless protocols with a service provider system 330 via an existing network of relay stations 325 In addition, the mobile device 324 may communicate wirelessly with point-of-sale devices 314 that have been equipped for wireless communications, such as through an NFC connection.

The mobile device 324 can be adapted to provide any of a number of mobile commerce functions related to one or more financial accounts such as credit accounts, debit accounts, demand deposit accounts, stored value accounts, etc. maintained by one or more financial institutions 316-318. The mobile device 324, for example via the mobile wallet application, may allow the user to review account balances, transfer balances, and/or select an account for a particular transaction such as a purchase or other payment. In the example of a purchase, upon selection of an account for use in the transaction, the user of the mobile device can scan or swipe the device 324 in front of or near the POS device 310 causing the selected account or other identifying information to be read from the mobile device 324 via the NFC connection.

The identifying information can indicate the account to be used in supporting transactions, for example, by including an indication of the financial institution 316 where that account is maintained, an account number, etc. According to one embodiment and as will be described in detail below, rather than storing account information on the mobile device to be read by the NFC reader, another unique identifier may be used. For example, a combination of the device serial number and user pin may be used to uniquely identify the user and/or device. The account to be used for the transaction can be indicated by information other than the account number and later correlated to the correct account number by the acquirer systems.

The point-of-sale device 308 typically initiates a connection to an acquirer system 312 through a network 304 such as the Internet or another network as described above. A packet of information that includes information read from the mobile device 324, a merchant identifier, the date, and transaction amount are forwarded by the point-of-sale device 310 through the network 304 to the acquirer system 312. The acquirer system 312 may store some of the information and send an authorization request, via financial network 313, to the issuing financial institution 318, which may be identified from a portion of the account number read from the mobile device 324. The transaction is authorized or denied depending on such factors as the validity of the account holder name, the validity of the account number, the level of available credit in comparison with the transaction amount, and the like. If authorized, an authorization code is routed back through the acquirer system 312, which captures additional information and forwards the authorization code back to the originating point-of-sale device 310 so that the transaction may be completed.

As will be seen, the mobile wallet and/or other applications of the mobile device 324 may store or maintain one or more marketing offers. Marketing offers stored on or accessible by a mobile device 324 can be accessed through the mobile wallet and used in financial transaction such as purchases. As will be described in detail below, when a marketing offer is used, the mobile device 324 can send a message indicating redemption of the offer to an entity tracking use of the offer. The message can be sent via the wireless communication network 325 to the provider of the communication services, i.e., the wireless service provider 330. As will be seen, the service provider 330 can track the use of the offer or may update or inform another entity of the redemption of the offer.

Figure 4A:
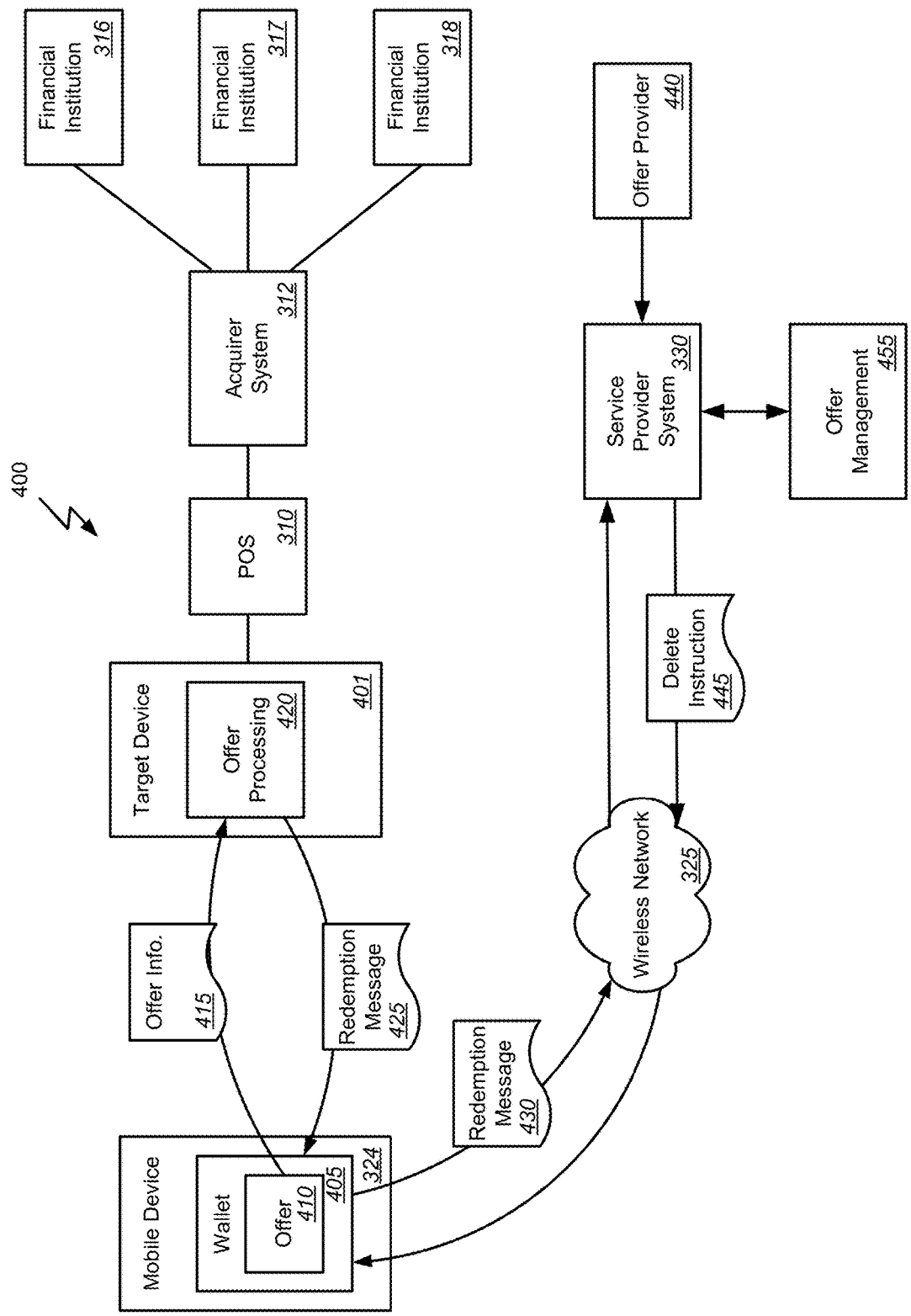
FIG. 4A is a block diagram illustrating additional details of the system of FIG. 3 according to one embodiment of the present invention.

FIG. 4A is a block diagram illustrating additional details of the system of FIG. 3 according to one embodiment of the present invention. As in the previous example, the system 400 can comprise a wireless communications network 325, such as a cellular network, and a service provider system 330 communicatively coupled with the wireless communications network 325. The system 400 can also include a target device 401 including a Near-Field Communications module (not shown here) and a mobile device 324 communicatively coupled with the wireless communications network 325 and including a Near-Field Communications module (not shown here). While illustrated here as separate components, the target device 401 can comprise or be part of a point-of-sale device 310. In other cases, the target device 401 can be separate from the point-of-sale device 310. In such cases, the target device 401, while separate from the point-of-sale device 310, may be co-located with the point-of-sale device 310, for example, at a merchant location, and may be communicatively coupled with the point-of-sale device 310 and/or a POS processing system (not shown here). In other cases, in addition to or instead of being communicatively coupled with the point-of-sale device 310, the target device 401 may be communicatively coupled with an acquirer system 312 or other element of the system 400.

The mobile device 324 can be adapted to execute a mobile wallet application 405. The mobile wallet application 405 can maintain one or more marketing offers 410. As noted above, the offers 410 can be provisioned to the mobile wallet 405 of the mobile device 324 in a variety of ways. For example, information related to the offer can be provided to the service provider system 330 by an offer provider 440 such as a manufacturer, merchant, service provider, financial institution, or other entity. The service provider system 330 may then transmit the offer information to the mobile wallet 405 of the mobile device 324 via the wireless network 325, i.e., Over-The-Air (OTA) provisioning. In other examples, the offer 410 may be provisioned to the mobile device 324 via a download from a website, via an NFC transfer from a POS device, or in any other of a variety of manners.

Regardless of how the offer 410 is provisioned to the mobile wallet 405 of the mobile device 324, the offer 410 is then available for use by the user of the mobile device 324 in a transaction such as a purchase from a merchant. Therefore, the mobile wallet 405 of the mobile device 324 can be further adapted to transmit information 415 related to the marketing offer 410 to the target device 401 via the NFC module of the mobile device 324, for example when the user passes the mobile device 324 near the NFC reader of the target device 401 or POS device 310 when paying for a purchase. In some cases, the mobile wallet application of the mobile device can store multiple offers 410. In such cases, prior to transmitting the information 415 related to the marketing offer to the target device 401, the mobile wallet application 405 can be adapted to receive a selection of the marketing offer 410 from the plurality of marketing offers.

That is, the mobile wallet application 410 may be adapted to present, via a user interface, the offers 410 available in the wallet 405 and receive a user selection of the offer that is intended to be used. The mobile wallet application 405 can then transmit the information 415 related to the selected marketing offer to the target device 401.

The target device 401 can be adapted to receive the information 415 related to the marketing offer from the mobile wallet application 405 of the mobile device 324 via the NFC module (not shown here). The target device 401 can include an offer processing module 420 that receives the information 415 related to the selected marketing offer and confirms whether the offer should be accepted or redeemed. For example, the target device 401, via the offer processing module 420, can be further adapted to present an indication of at least a portion of the information 415 related to the marketing offer to an operator of the target device 401 and/or POS device 310, e.g., a cashier. The offer processing module 420 can the receive an indication of acceptance of the marketing offer from the operator. In response to receiving the indication of acceptance of the marketing offer, the target device 401, for example via the offer processing module 420 can generate and transmit a redemption message 425 to the mobile device 324 via the NFC module of the target device 401. In some cases, the target device 401 may communicate information related to the marketing offer, e.g., a discount amount, etc., to the POS device 310. In other cases, information such as a discount amount may be entered by the cashier or operator of the POS device to adjust the amount of the transaction based on the marketing offer.

The mobile device 324 can receive the redemption message 425 from the target device 401 via the NFC module of the mobile device 324. The redemption message 425 can indicate acceptance and redemption of the marketing offer. Therefore, according to one embodiment, the mobile wallet application 405 can be adapted to delete the offer 410 from the mobile wallet 405 upon receipt of the redemption message 425. Alternatively, the mobile wallet application 405 may retain the offer 410 until instructed to delete the offer 410 as will be described below. In either event, the mobile device 324 can send at least a portion of the redemption message 430 to the service provider system 330 via the wireless communications network 325.

The service provider system 330 can be adapted to receive the redemption message 430 related to the selected marketing offer from the mobile wallet 405 of the mobile device 324 via the wireless communications network 325. In the example illustrated in FIG. 4A, the service provider system 330 can provide for management of the use of the marketing offers via an offer management module 455. For example, the service provider system 300, via the offer management module 455 can be adapted to maintain a set of information related to one or more marketing offers. The information can include a status of each of the one or more marketing offers. In such cases, the service provider system 330 via the offer management module 455 can update the set of information related to the one or more marketing offers to indicate redemption of the selected marketing offer, i.e., the offer indicated by the redemption message 430, in response to receiving the redemption message 430. If appropriate based on the set of information related to the marketing offer maintained by the offer management module 455, the service provider system 330 can generate a delete message 445 related to redemption of the selected marketing offer and send the delete message 445 to the mobile wallet 405 of the mobile device 324 via the wireless communications network 325. The mobile wallet application 405 can in turn, upon receiving the delete instruction 445 remove the offer 410 from the wallet 405.

In other cases, based on the set of information related to the marketing offers maintained by the offer management module 455, no delete message may be generated. For example, some offers may be re-usable or may have other criteria for expiration or multiple redemptions. In such cases, the offer management module 455 and/or the service provider system 330 can update the information related to the offers use to track the offer's use. A delete instruction can then be issued by the service provider system at a later time, based on additional uses or other criteria.

Figure 4B:
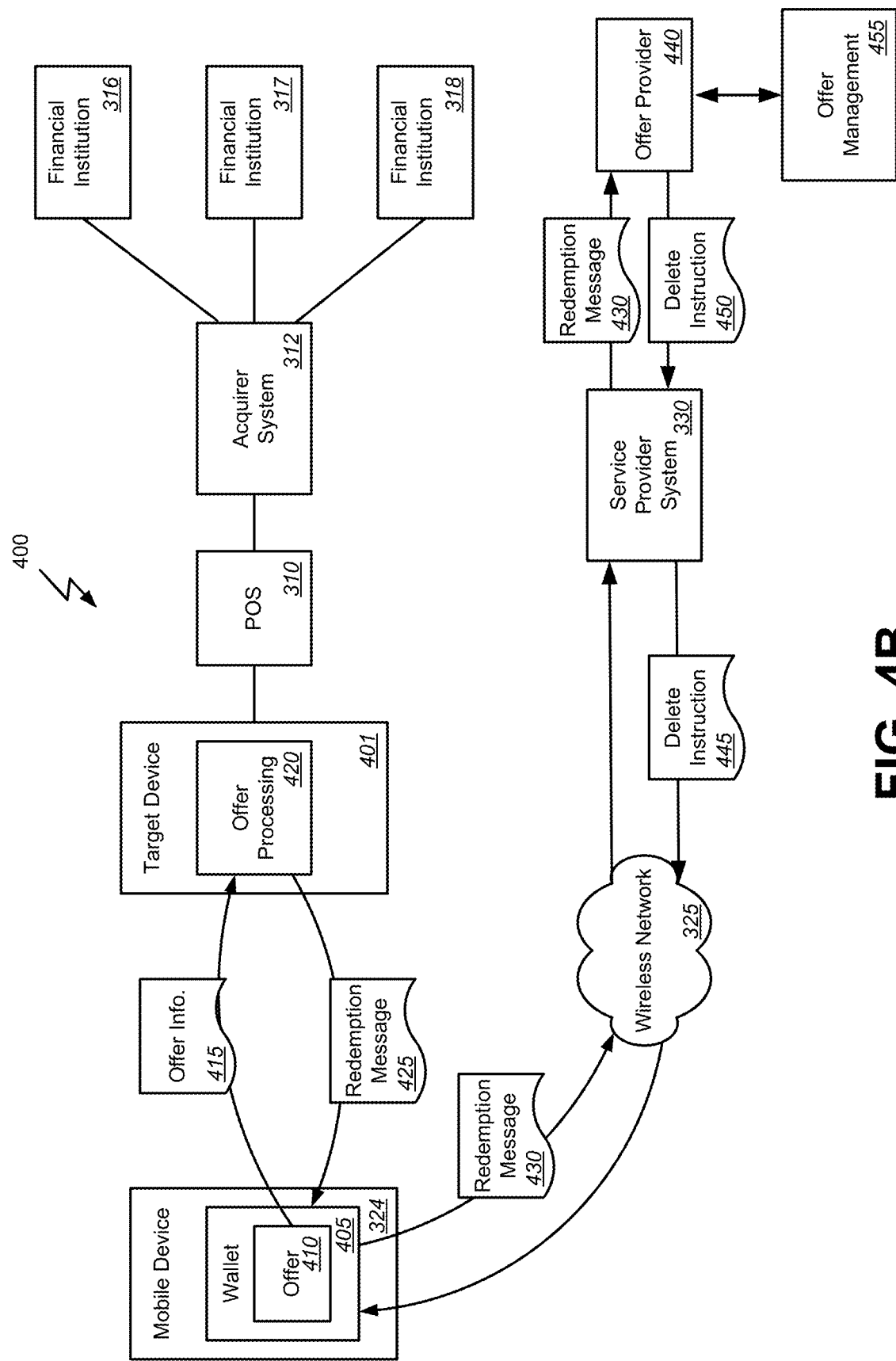
FIG. 4B is a block diagram illustrating additional details of the system of FIG. 3 according to an alternative embodiment of the present invention.

FIG. 4B is a block diagram illustrating additional details of the system of FIG. 3 according to an alternative embodiment of the present invention. In this example, the system 400 includes the target device 401, POS device 310, mobile device 324, wireless network 325 and service provider system 330 that can be adapted to operate as described above with reference to FIG. 4A. However, in this embodiment, the system can include an originator system, i.e., an offer provider system 440, communicatively coupled with the service provider system 330. In this embodiment, the offer provider system 440, rather than the service provider system 330, can be adapted to maintain a set of information related to the one or more marketing offers, for example via an offer management module 455. As noted above, the information can include a status of each of the one or more marketing offers.

In this embodiment, the service provider system 330 can be further adapted to provide the redemption message 435 to the offer provider system 440. The offer provider system 440 can be further adapted to update the set of information related to the one or more marketing offers to indicate redemption of the selected marketing offer based on the redemption message 435 from the service provider system 330. The service provider system 330 can also be adapted to receive an instruction 450 to delete the marketing offer 410 from the mobile wallet 405 of the mobile device 324 from the offer provider system 440. In such cases, the service provider system 330 can generate the delete message 445 and send the delete message 445 to the mobile wallet 405 of the mobile device 324 in response to receiving the instruction 450 to delete the selected marketing offer from the offer provider system 440.

As noted above, in other cases, based on the set of information related to the marketing offers maintained by the offer management module 455, no delete message may be generated. For example, some offers may be re-usable or may have other criteria for expiration or multiple redemptions. In such cases, the offer management module 455 and/or the offer provider system 440 can update the information related to the offers use to track the offer's use. A delete instruction 450 can then be issued to the offer provider system 440 at a later time, based on additional uses or other criteria.

Figure 4C:
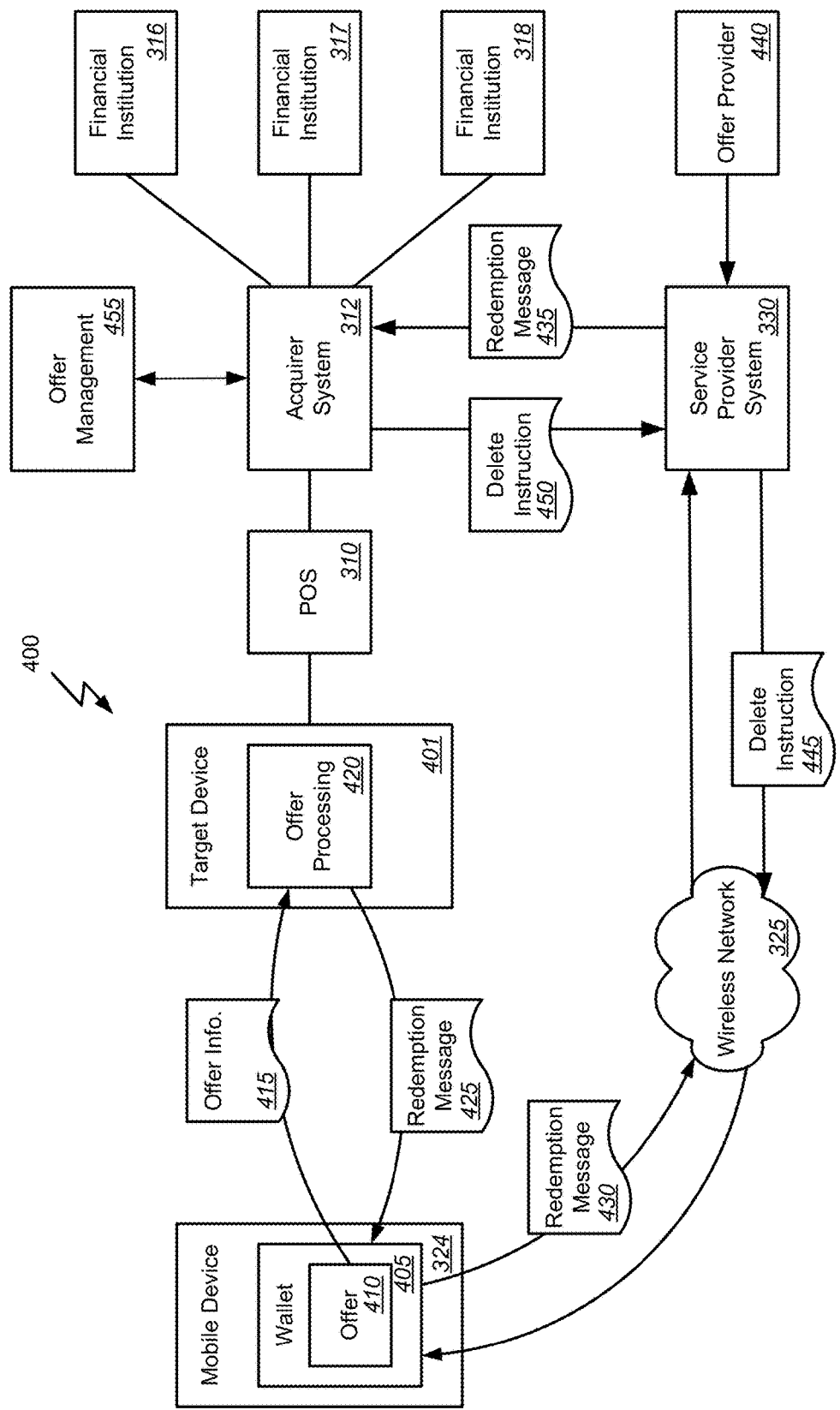
FIG. 4C is a block diagram illustrating additional details of the system of FIG. 3 according to yet another alternative embodiment of the present invention.

FIG. 4C is a block diagram illustrating additional details of the system of FIG. 3 according to yet another alternative embodiment of the present invention. In this example, the system 400 includes the target device 401, POS device 310, mobile device 324, wireless network 325 and service provider system 330 that can be adapted to operate as described above with reference to FIG. 4A. However, in this embodiment, the system 400 can include an acquirer system 312 such as described above communicatively coupled with the service provider system 330. In this embodiment, the acquirer system 312 can be adapted to maintain a set of information related to the one or more marketing offers, for example via an offer management module 455. As noted above, the information can include a status of each of the one or more marketing offers.

In this embodiment, the service provider system 330 can be adapted to provide the redemption message 435 to the acquirer system 312. The acquirer system 312, for example via offer management module 455, can update the set of information related to the one or more marketing offers to indicate redemption of the selected marketing offer based on the redemption message 435 from the service provider system 330. The service provider system 330 can be adapted to receive an instruction 450 to delete the marketing offer 410 from the mobile wallet 405 of the mobile device 324 from the acquirer system 312. In such a case, the service provider system 330 can generate the delete message 445 and send the delete message 445 to the mobile wallet 405 of the mobile device 324 in response to receiving the instruction 450 to delete the selected marketing offer 410 from the acquirer system 312.

As noted above, in other cases, based on the set of information related to the marketing offers maintained by the offer management module 455, no delete message may be generated. For example, some offers may be re-usable or may have other criteria for expiration or multiple redemptions. In such cases, the offer management module 455 and/or the offer provider system 440 can update the information related to the offers use to track the offer's use. A delete instruction 450 can then be issued to the acquirer system 312 at a later time, based on additional uses or other criteria.

Figure 5:
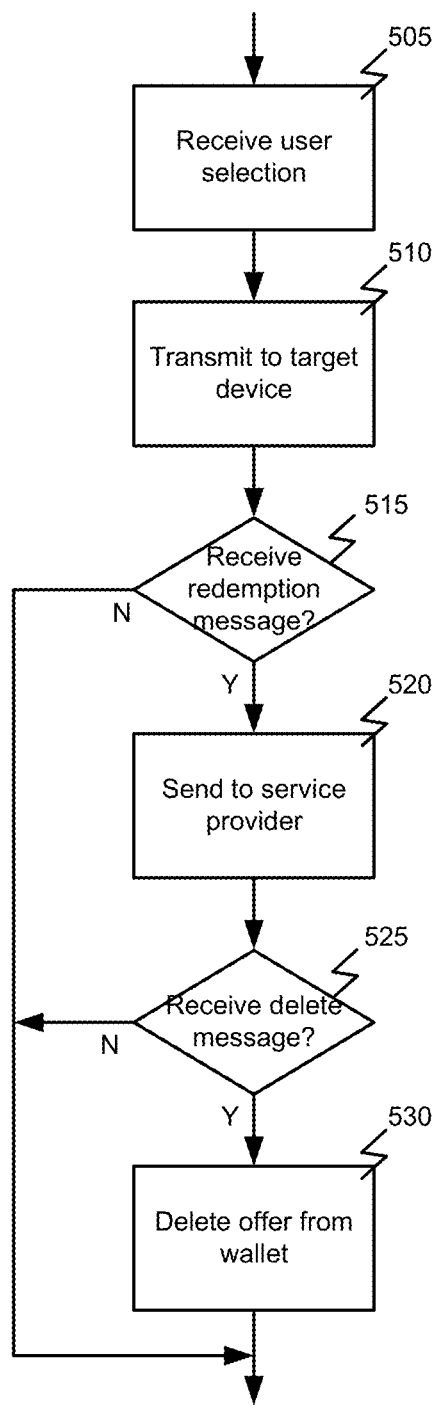
FIG. 5 is a flowchart illustrating a process for redeeming and reporting use of a marketing offer such as may be performed by a mobile wallet application according to one embodiment of the present invention.

FIG. 5 is a flowchart illustrating a process for redeeming and reporting use of a marketing offer such as may be performed by a mobile wallet application according to one embodiment of the present invention. In this example, the process begins with receiving 505 a selection of the marketing offer from a plurality of marketing offers in the mobile wallet of the mobile device. The information related to the selected marketing offer can be transmitted 510 from the mobile wallet of the mobile device to the target device.

A redemption message can be received 515 at the mobile wallet of the mobile device from the target device. The redemption message can indicate acceptance of the marketing offer. In response to receiving 515 the redemption message, at least a portion of the redemption message can be sent 520 from the mobile wallet of the mobile device to a service provider system providing communication services to the mobile device. Sending 520 the redemption message from the mobile wallet of the mobile device to the service provider system can be performed via a wireless communications network such as a cellular network. In reply, a delete message from the service provider system and related to the marketing offer can be received 525 at the mobile wallet of the mobile device. In response to receiving 515 the delete message, the marketing offer can be deleted 530 from the mobile wallet of the mobile device.

Figure 6:
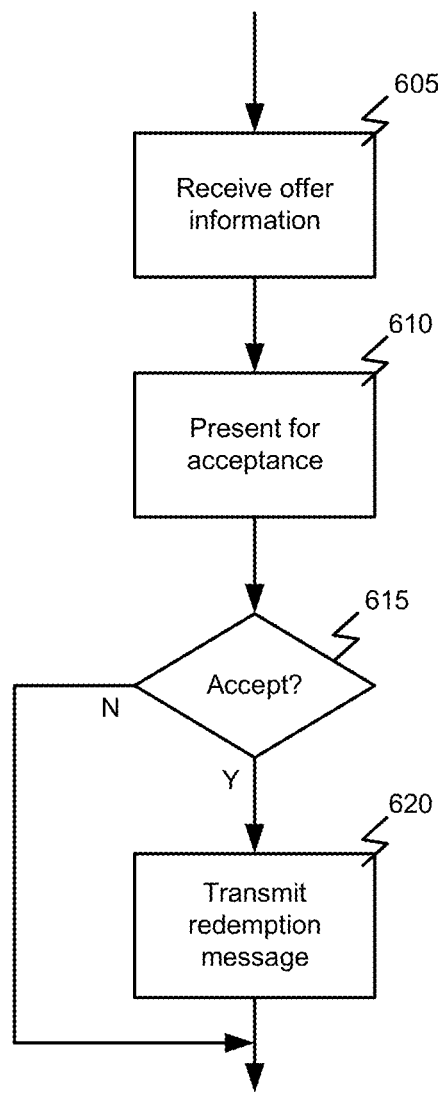
FIG. 6 is a flowchart illustrating a process for redeeming a marketing offer such as may be performed by a target device according to one embodiment of the present invention.

FIG. 6 is a flowchart illustrating a process for redeeming a marketing offer such as may be performed by a target device according to one embodiment of the present invention. In this example, the process begins with receiving 605 at a target device information related to a marketing offer from a mobile wallet application of a mobile device. According to one embodiment, at least a portion of the information related to the marketing offer can be presented 610 for acceptance via the target device. An indication of acceptance of the marketing offer can be received 615 at the target device. In response to receiving 615 at the target device the indication of acceptance of the marketing offer, a redemption message can be transmitted 620 from the target device to the mobile device.

Figure 7:
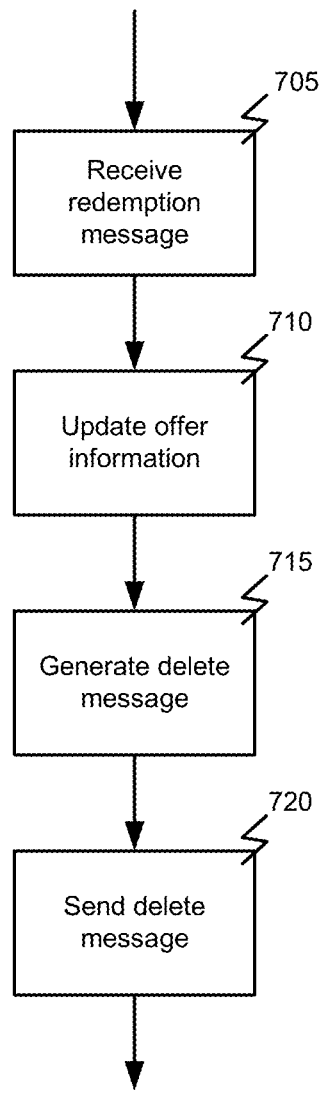
FIG. 7 is a flowchart illustrating a process for managing one or more marketing offers such as may be performed by a service provider system according to one embodiment of the present invention.

FIG. 7 is a flowchart illustrating a process for managing one or more marketing offers such as may be performed by a service provider system according to one embodiment of the present invention. In this example, the process begins with receiving 705 at a service provider system a redemption message related to a selected marketing offer of one or more marketing offers from a mobile wallet of a mobile device. As noted above, according to one embodiment, a set of information related to the one or more marketing offers can be maintained by the service provider system. The information can include a status of each of the one or more marketing offers. The set of information related to the one or more marketing offers can be updated 715 to indicate redemption of the selected marketing offer in response to receiving the redemption message. A delete message can be generated 715 by the service provider system related to redemption of the selected marketing offer. The delete message can be sent 720 from the service provider system to the mobile wallet of the mobile device.

In another embodiment, as noted above, maintaining the set of information related to the one or more marketing offers and updating 710 the set of information related to the one or more marketing offers can be performed by a system originating the selected marketing offer. In such a case, the redemption message can be provided to the system originating the selected marketing offer from the service provider system. The service provider system can then receive an instruction to delete the selected marketing offer from the mobile wallet of the mobile device from the system originating the selected marketing offer. In such cases, generating 715 the delete message and sending 720 the delete message from the service provider system to the mobile wallet of the mobile device can be performed in response to receiving the instruction to delete the selected marketing offer from the mobile wallet of the mobile device from the system originating the selected marketing offer.

In yet another example, also as noted above, maintaining the set of information related to the one or more marketing offers and updating 710 the set of information related to the one or more marketing offers can be performed by an acquirer system. In such a case, the redemption message can be provided by the service provider system to the acquirer system. The service provider system can then receive an instruction to delete the selected marketing offer from the mobile wallet of the mobile device from the acquirer system. In such cases, generating 715 the delete message and sending 720 the delete message from the service provider system to the mobile wallet of the mobile device can be performed in response to receiving the instruction to delete the selected marketing offer from the mobile wallet of the mobile device from the acquirer system.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for managing electronic messages relating to marketing offers for a wireless transaction conducted at a point-of-sale (POS) device, the system comprising:
    a mobile device having a mobile wallet application, the mobile device wirelessly transmitting to the POS device information related to a marketing offer stored at the mobile wallet application of the mobile device, the mobile device wirelessly receiving a redemption message from the POS device indicating acceptance of the marketing offer and transmitting at least a portion of the redemption message to a wireless service provider system that provides wireless communication services to the mobile device; and
    an offer management system communicatively coupled with the wireless service provider system, the offer management system maintaining status information related to the marketing offer, receiving the redemption message from the wireless service provider system, updating the status information in response to the redemption message received from the wireless service provider system, and providing a delete instruction to the wireless service provider system in response to receiving the redemption message from the wireless service provider system;
    wherein the wireless service provider system generates, in response to the delete instruction, a delete message related to the marketing offer and transmits the delete message to the mobile device; and
    wherein the mobile application of the mobile device deletes the marketing offer stored at the mobile wallet application of the mobile device in response to the delete message transmitted from the wireless service provider system to the mobile device, thereby preventing re-use of the marketing offer.

2. The system of claim 1, wherein prior to the mobile device transmitting the information related to the marketing offer from the mobile device to the POS device, the mobile device receives a selection of the marketing offer from a plurality of marketing offers stored at the mobile wallet application of the mobile device, wherein transmitting the information related to the marketing offer from the mobile device to the POS device comprises transmitting information related to the selected marketing offer.

3. The system of claim 1, wherein transmitting information related to the marketing offer from the mobile device to the POS is performed via a Near-Field Communication between the mobile device and the POS device.

4. The system of claim 1, wherein wireless communications services are provided over a wireless communications network.

5. The system of claim 1, wherein the info' nation related to the marketing offer is wirelessly transmitted from the mobile device to the POS device directly without interception by any other device, and wherein the redemption message is wirelessly received by the mobile device from the POS device directly without interception by any other device.

6. The mobile device of claim 1, wherein the offer management system is communicatively coupled to the wireless service provider system via an acquirer system, the acquirer system serving as an intermediary between merchants and card issuer financial institutions, wherein the acquirer system maintains status information related to the marketing offer via communications with the offer management system, wherein the wireless service provider system provides the redemption message to the acquirer system, wherein the acquirer system updates the status information via communications with the offer management system in response to the redemption message received from the wireless service provider system, wherein the acquirer system provides the delete instruction to the wireless service provider system in response to receiving the redemption message from the wireless service provider system, and wherein the wireless service provider system generates, in response to the delete instruction, the delete message received at the mobile device from the wireless service provider system.

7. The system of claim 1, wherein the marketing offer is provided to the mobile application of the mobile device by an offer provider using the wireless communications services.

8. The system of claim 7, wherein the offer provider is selected form a group comprising a manufacturer, merchant, wireless service provider and financial institution.

9. The system of claim 1, wherein the mobile wallet application is a software application resident on the mobile device.

10. The system of claim 9, wherein the mobile wallet application further stores payment account information for use in conducting the wireless transaction at the POS device.

11. A method for managing electronic messages relating to marketing offers for a wireless transaction, the method comprising:
    wirelessly transmitting to a point of sale (POS) device, from a mobile device having a mobile wallet application, information related to a marketing offer stored at the mobile wallet application of the mobile device;
    wirelessly receiving at the mobile device, from the POS device, a redemption message indicating acceptance of the marketing offer;
    receiving, at a wireless service provider system providing wireless communication services to the mobile device, at least a portion of the redemption message from the mobile device; and
    at an offer management system communicatively coupled with the wireless service provider system, maintaining status information related to the marketing offer, receiving the redemption message from the wireless service provider system, updating the status information in response to the redemption message received from the wireless service provider system, and providing a delete instruction to the wireless service provider system in response to receiving the redemption message from the wireless service provider system;
    wherein the wireless service provider system generates, in response to the delete instruction, a delete message related to the marketing offer and transmits the delete message to the mobile device; and
    wherein the mobile application of the mobile device deletes the marketing offer stored at the mobile wallet application of the mobile device in response to the delete message transmitted from the wireless service provider system to the mobile device, thereby preventing re-use of the marketing offer.

12. The method of claim 11, wherein prior to the mobile device transmitting the information related to the marketing offer from the mobile device to the POS device, the mobile device receives a selection of the marketing offer from a plurality of marketing offers stored at the mobile wallet application of the mobile device, wherein transmitting the information related to the marketing offer from the mobile device to the POS device comprises transmitting information related to the selected marketing offer.

13. The method of claim 11, wherein transmitting information related to the marketing offer from the mobile device to the POS is performed via a Near-Field Communication between the mobile device and the POS device.

14. The method of claim 11, wherein wireless communications services are provided over a wireless communications network.

15. The method of claim 11, wherein, wherein the information related to the marketing offer is wirelessly transmitted from the mobile device to the POS device directly without interception by any other device, and wherein the redemption message is wirelessly received by the mobile device from the POS device directly without interception by any other device.

16. The method of claim 11, wherein the offer management system is communicatively coupled to the wireless service provider system via an acquirer system, the acquirer system serving as an intermediary between merchants and card issuer financial institutions, wherein the acquirer system maintains status information related to the marketing offer via communications with the offer management system, wherein the wireless service provider system provides the redemption message to the acquirer system, wherein the acquirer system updates the status information via communications with the offer management system in response to the redemption message received from the wireless service provider system, wherein the acquirer system provides the delete instruction to the wireless service provider system in response to receiving the redemption message from the wireless service provider system, and wherein the wireless service provider system generates, in response to the delete instruction, the delete message received at mobile device from the wireless service provider system.

17. The method of claim 11, wherein the marketing offer is provided to the mobile application of the mobile device by an offer provider using the wireless communications services.

18. The method of claim 17, wherein the offer provider is selected from a group comprising a manufacturer, merchant, wireless service provider and financial institution.

19. The method of claim 11, wherein the mobile wallet application is a software application resident on the mobile device.

20. The method of claim 19, wherein the mobile wallet application further stores payment account information for use in conducting the wireless transaction at the point-of-sale device.

* * * * *